Aug. 26, 1941.     D. S. ANTHONY     2,254,056
CUTOFF TOOL AND HOLDER
Filed March 9, 1940     3 Sheets-Sheet 2
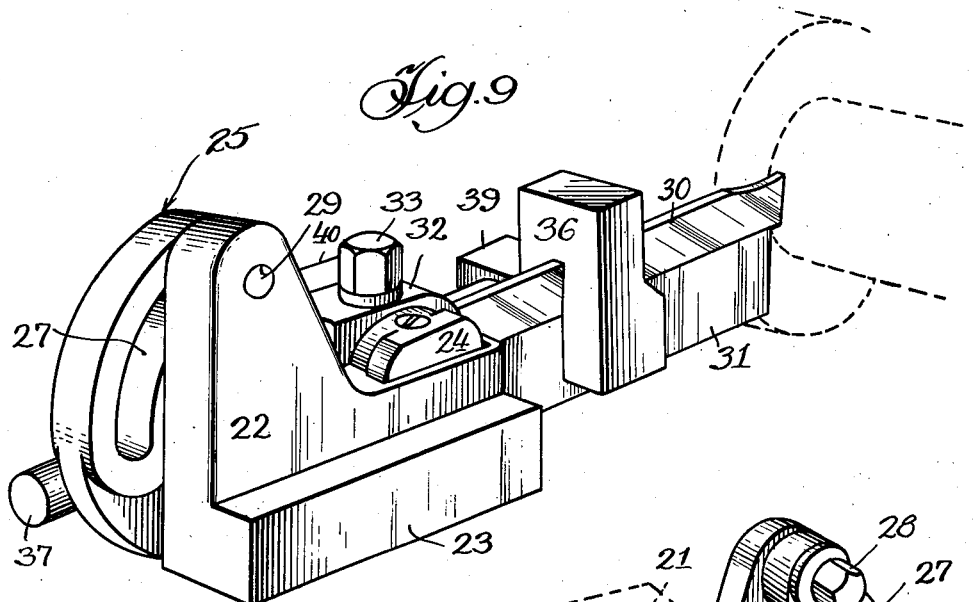
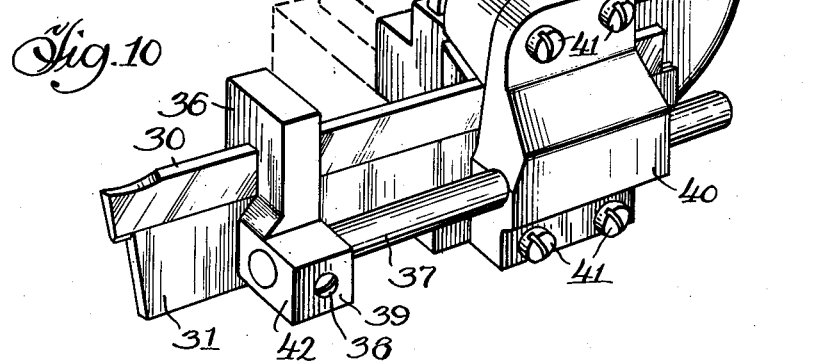
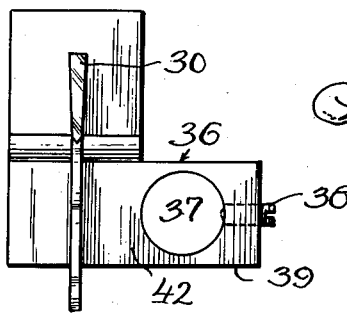
INVENTOR.
David S. Anthony,
BY Parkinson & Lane
ATTORNEYS.

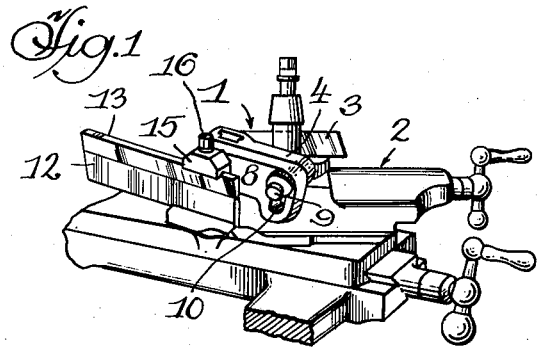
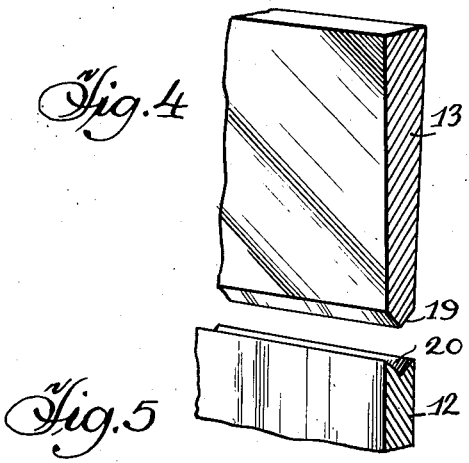
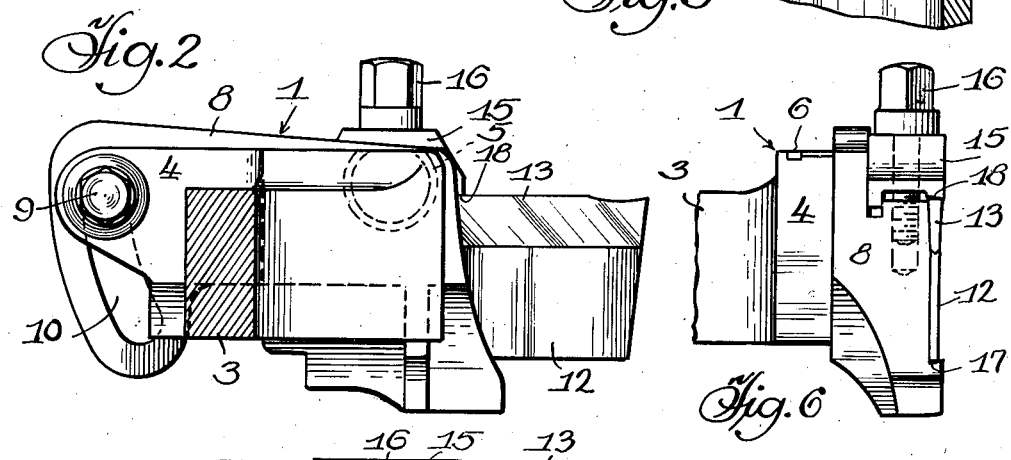
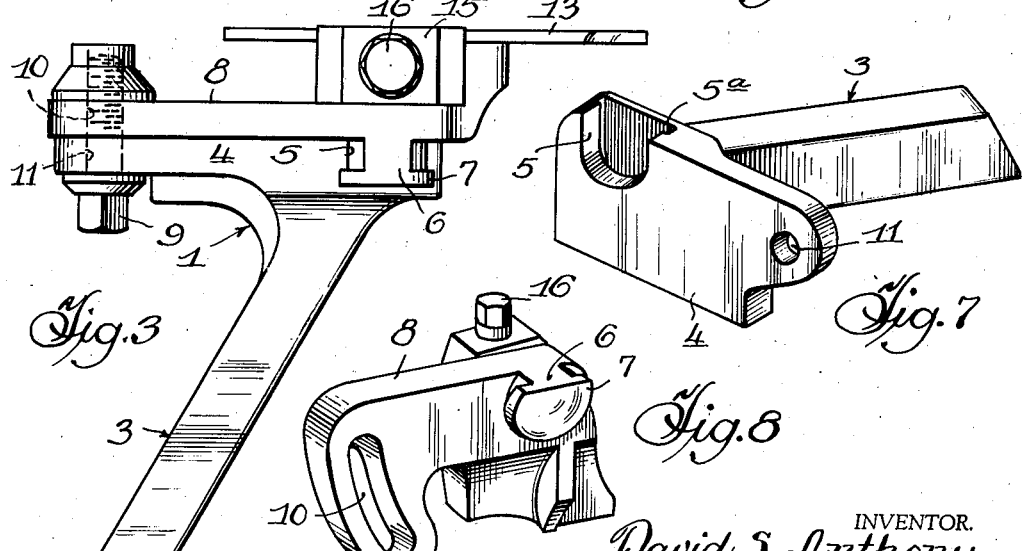

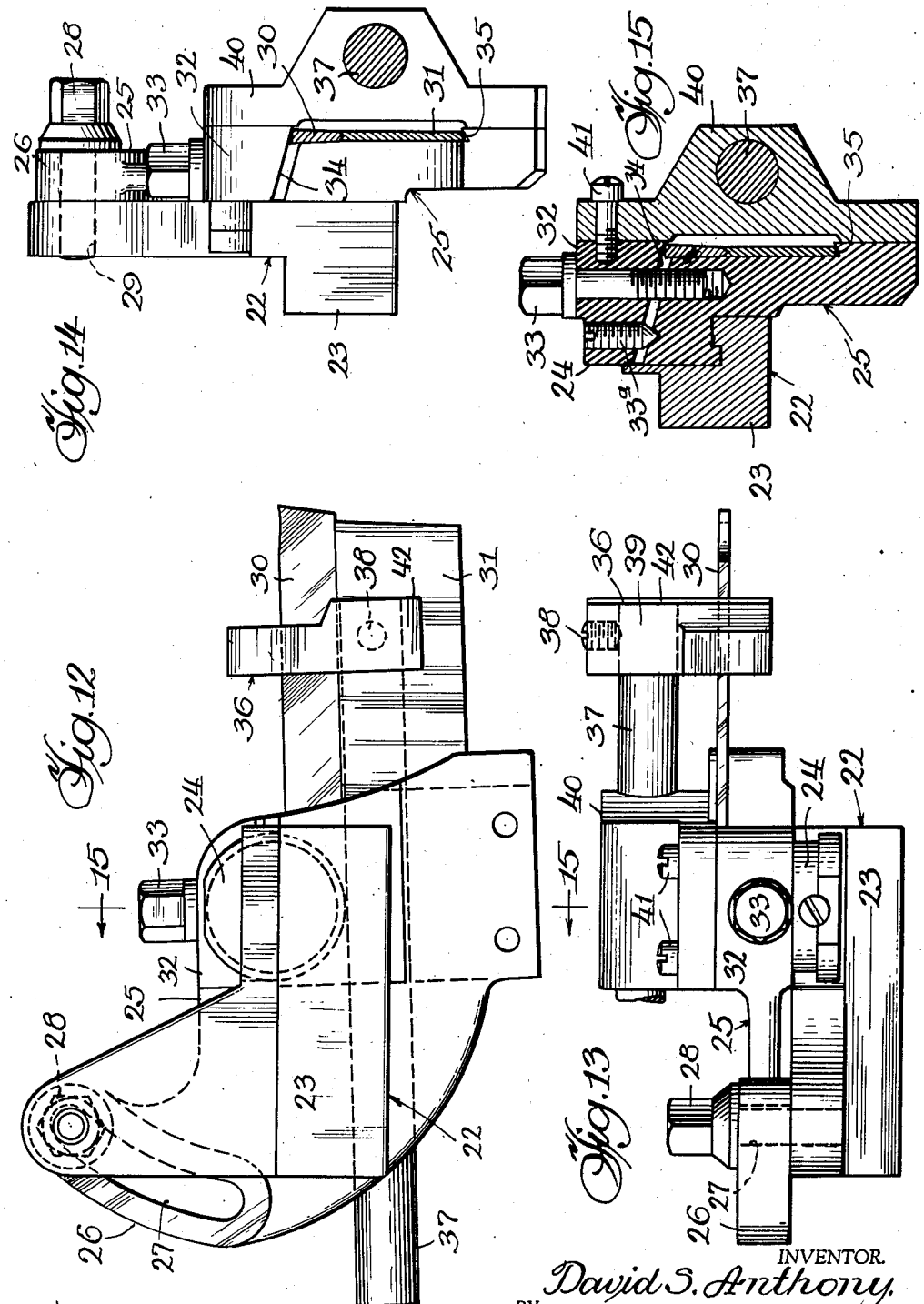

Patented Aug. 26, 1941

2,254,056

UNITED STATES PATENT OFFICE 2,254,056

CUTOFF TOOL AND HOLDER

David S. Anthony, San Antonio, Tex.

Application March 9, 1940, Serial No. 323,053

9 Claims. (Cl. 29—96)

The present invention relates to a novel tool holding mechanism and cut-off tool for use on power operated lathes and similar types of machines for cutting stock of relatively large diameter or cross section and at a high rate of speed.

The novel invention resides in a tool holder adapted to be mounted on the usual carriage and tool support of a power operated high speed lathe of any conventional or standard type, the invention being shown for illustrative purposes as embodied in a holding mechanism for use on an engine and turret lathe. The invention further comprehends a tool holder so constructed and arranged that should the cutting tool be subjected to excessive strain, its mounting upon the shank will give and the holder will pivot in such manner as to swing the tool out of the path of the work being operated upon, thereby preventing damage to the tool, machine and material and protecting the operator against personal injury.

An important feature of the present invention is the mounting of the cutting blade in such manner that the cutting edge or upper cutting surface of the blade is always below the center of the fulcrum or pivoting center and normally disposed below the plane or upper surface of the holding shank and the lower surface of the support for the blade is normally disposed below the plane or lower surface of this shank. This permits cutting of objects of larger dimensions than those previously cut by conventional cutting tools.

Another important feature of the invention is the provision of an adjustable support and guide for supporting and maintaining the cutting blade rigid and preventing its distortion or bending during the cutting operation. This is accomplished by means of an adjustable member slotted in such manner as to receive and conformably encompass and retain the blade and its support, and as the tool cuts deeper into the work, this member is automatically retracted by contact with the work.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while I have shown therein a preferred embodiment, it is to be understood that the same is susceptible of modification and change, and comprehends other details, arrangements of parts, features and constructions without departing from the spirit of the invention.

In the drawings:

Fig. 1 is a perspective view of the novel tool holding mechanism mounted upon a conventional carriage and adjusting mechanism for the tool of a conventional engine lathe.

Fig. 2 is a view in side elevation of the tool holder.

Fig. 3 is a top plan view of the tool holder.

Figs. 4 and 5 are fragmentary views in perspective of the novel tool blade and support therefor.

Fig. 6 is a fragmentary view in front or end elevation of the tool holder and showing the manner of holding the tool blade and blade support in the mounting.

Fig. 7 is a view in perspective of the shank section or mounting for the tool holder.

Fig. 8 is a view in perspective showing the rear face of the tool holder and its manner of mounting upon or connection with the shank section.

Fig. 9 is a view in perspective of an alternate construction of tool holding mechanism particularly adapted for turret lathes or the like.

Fig. 10 is a view in perspective of the tool holding mechanism of Fig. 9 but taken from the opposite side of the holder.

Fig. 11 is a view in front elevation of the adjustable support and guide for the tool blade and its supporting plate.

Fig. 12 is a view in side elevation of the holder for a turret lathe.

Fig. 13 is a top plan view of this device.

Fig. 14 is a view in end elevation looking to the right of Figs. 12 and 13, but with the adjustable support and guide omitted and the blade, blade support and mounting for the guide in section.

Fig. 15 is a view in vertical cross section taken in the plane represented by the line 15—15 of Fig. 14.

Referring more particularly to the disclosure in Figs. 1 to 8, inclusive, of the drawings, the novel tool holding device 1 therein disclosed is shown as mounted upon the carriage and adjusting mechanism 2 of a conventional or standard type of engine lathe, the holding device being connected thereto by means of an offset shank 3. This shank is provided with a supporting plate 4 having an arcuate slot 5 enlarged or recessed at 5ª for the reception and pivotal mounting of a trunnion 6 having an annular enlargement 7 adapted to seat in the shouldered recess 5ª. The trunnion 6 is provided or formed adjacent the upper edge on the rear surface of a tool holder 8 and at one end thereof. This tool holder 8 is shown as pivoted upon the trunnion to one end of the plate 4 and has its other end connected to this plate 4 by means of a set bolt 9 adapted to be received in an arcuate slot 10 in the holder and passing through an opening 11 in the plate, whereby the tool holder is permitted to pivot, under certain circumstances as later more fully explained, upon its trunnion.

The face of the tool holder is channelled or recessed for receiving a blade support 12 and a cut-off tool or cutting blade 13, these members 12 and 13 being adapted to be rigidly held in place by means of a clamp head or cap 15 and an adjustable set bolt 16, the latter being threaded into the tool holder as seen in Fig. 6. As clearly shown in the drawings, the blade support 12 is substantially co-extensive in length with the blade or tool and of a thickness somewhat less than that of the cutting edge of the blade but of a width preferably greater than the blade. To obtain the most effective results in cutting large stock, I have found it desirable that the combined width of the blade or tool assembly comprising the tool and its support, or of the blade alone where no other support is provided, be approximately one-half the diameter or cross section of the stock to be cut.

In order that the tool support 12 may most effectively support the blade and the blade may most effectively cut stock of large diameter or cross section, the upper surface or cutting edge of this blade is disposed in a plane below that of the center or axis of the fulcrum of the holder and the lower surface or edge of the blade support 12 is disposed in a plane below the seat or lower surface of the shank, whereby the cutting tool may be employed to cut stock of various dimensions and shapes, including cutting, splitting or plowing flat stock in a shaper.

So as to most effectively maintain the blade and its support within the tool holder, the shoulder portion 17 of the tool holding recess is undercut in such manner that this surface will effectively tip in the support and maintain it rigid against the supporting surface of the tool holder. If desired, the tool support may also be bevelled but preferably less than the shoulder 17. In a similar manner the undersurface 18 of the head or cap is suitably undercut or inclined in such manner that it tips in the blade 13 against its supporting surface on the holder. In addition, in order to most effectively retain the blade in cutting position on its support, these members are provided with complementary dovetailed surfaces 19 and 20.

From the above description it will be readily apparent that the tool holding device is of simplified construction, requiring a minimum number of parts and in which the tool holder is mounted on the conventional tool post and may be readily adjusted as required or desired in performing its work. Furthermore, it will be appreciated that the outer end of the holder 8 is but frictionally held against pivotal movement by the set bolt 9 in the arcuate slot 10. Thus, the blade or tool may be adjustably positioned about this pivot, and should the blade meet severe resistance in its cutting, as should there be loose or undue play in the spindle causing the work to climb on the point of the tool, or if the stock is not properly tightened in the chuck so as to maintain its center of rotation, or should the tool encounter a hard spot in the stock being operated upon, the tool, its support and holder would pivot free from the work. Were such a strain encountered in prior devices, either the tool would be broken or damage done to the chuck, spindle or compound rest with which the lathe is equipped.

Figs. 9 to 15, inclusive, disclose an alternate construction which is primarily adapted, although not limited thereto, to turret lathes or other machines for cutting stock, in which the novel construction is shown as mounted on a conventional carriage and tool post or support 21. In this form of the invention, the novel construction is provided or formed with a base plate 22 and a shank 23 adapted to be suitably mounted in a conventional turret lathe. As in the embodiment previously described, the plate 22 is formed with an arcuate-shaped opening or recess for receiving a trunnion 24 mounted upon the rear face of a tool holder 25. This tool holder is provided with an outwardly and upwardly projecting portion or extension 26 having an arcuate slot 27 adapted to receive an adjustable set bolt 28 adapted to be threaded into an opening 29 in a projection of the plate 22. Thus, it will be evident that the tool holder is adapted to pivot on its fulcrum 24 and about the plate and support 22, through an arc measured by the slot 27. As in the previous construction, this permits ready adjustment of the tool holder and prevents damage to the tool blade and its associated parts, as well as to the chuck, spindle, or other parts of the lathe.

The blade or cut-off tool 30 and its support 31 are preferably of a construction and contour similar to that of the corresponding members in Figs. 1 to 8, inclusive. Also, in this form of the invention, the upper surface of the cutting blade is disposed below the center or pivoting axis of the fulcrum 24 while the lower edge or surface of the blade support is disposed well below the lower surface of the shank 23.

In this form of the invention, the blade and its support are locked in position by means of an adjustable head or cap 32 having an adjusting set bolt 33, the head or cap being formed integral (see Fig. 10) with the tool holder but in order to provide for adjustability, this holder is split along an inclined plane completely through the holder and its fulcrum 24 as more clearly shown in Fig. 15. A set screw 33ª controls adjustment of the cap. The lower surface 34 of this head or cap is so inclined or tapered as to force the blade inwardly against the face of the holder. Likewise, this holder is undercut or inclined at 35 to retain the blade support 31 against the holding surface.

In order to effectively support and guide the blade and its supporting member, the holder may be equipped with an adjustably mounted combined support and guide. In the embodiment illustrated, the combined guide and support 36 is slotted to conformably receive the cut-off tool or blade 30 and support 31 but permitting relative movement as the blade cuts into the work. This is accomplished by means of a slidable guide rod 37 having its forward end secured by a set screw 38 in an offset 39 of the support and guide 36. The opposite end of this rod is loosely received in a complementary opening in a bracket 40 removably secured to the adjusted head or cap 32 and tool holder 25, after the blade and its support have been anchored in position, by means of spaced bolts or other attaching means 41. Thus, as the blade cuts into the work, the guide supports and directs the blade or cut-off tool as it enters the stock, thereby preventing bending or distortion of the blade and its support and as this blade further cuts into the work, abutment of the outer face 42 of the guide member 36 against the work will force this member rearwardly on the blade and its blade support as the work progresses, thereby always maintaining the blade in rigid aligned relation with the work and resulting in an aligned or straight cut.

From the above description and the disclosure in the drawings, it will be appreciated that the invention comprehends a novel construction of tool holder and cut-off tool for use on a conventional type lathe and similar machines which will permit accurate cutting of stock of larger diameter than has been heretofore possible and at a greatly increased rate of speed, and without danger of the cutting tool becoming jammed or broken, as well as eliminating the possibility of damage to the spindle, chuck or other parts of the lathe when the cutting tool is subjected to an excessive strain.

Having thus disclosed the invention,

I claim:

1. Holding mechanism for mounting a cut-off tool on the conventional tool post of a lathe or the like, comprising a mounting having a supporting shank adapted to be secured to the tool post, a recess provided at the upper edge and adjacent one end of said mounting, and a tool holder having a trunnion adjacent its one end adapted to be received in said recess for pivotally supporting the tool holder, an arcuate slot provided in the other end of said tool holder, and an adjusting bolt in said slot and anchored in the mounting, said bolt being adapted to frictionally secure the blade holder in a predetermined operative position and the length of said arcuate slot being such as to permit the tool and holder to move away from engagement with the work should the tool be subjected to excessive strain.

2. Holding mechanism for mounting a cut-off tool on the conventional tool post of a lathe or the like, comprising a mounting adapted to be secured to the tool post, a recess provided at the upper edge and adjacent one end of said mounting, a tool holder having a trunnion adjacent its one end adapted to be received in said recess for pivotally supporting the tool holder, and means for limiting the pivotal movement of the holder upon its mounting, said means including an arcuate slot in the holder and an adjusting bolt passing through the slot and secured in said mounting, said bolt being adapted to frictionally retain the tool in operative position under normal operating conditions but permitting the tool and holder to pivot on the trunnion in an amount defined by the length of the slot should the tool be subjected to a strain greater than the frictional retention of the bolt.

3. A tool holding device for mounting a cut-off tool on a lathe or the like, comprising a support having a shank adapted to be secured to the conventional tool post of the lathe, a recess formed in said support and provided with a shouldered portion, a tool holder having a trunnion adjacent one end adapted to be received in said recess and provided with an enlargement adapted to seat in the shouldered portion whereby the holder is fulcrumed at one end in said support for pivotal movement, and means associated with the other end of said holder for locking said holder against pivotal movement except when the tool is subjected to excessive strain when the holder pivots about its fulcrum to the extent of the slot and moves the tool out of the path of the stock being operated upon, and thereby preventing damage to the lathe, tool and material and protecting the operator against personal injury.

4. A tool holding device for mounting a cut-off tool in a machine such as a lathe, shaper or the like, comprising a support having a shank adapted to be secured to the conventional tool post of the machine, a recess formed in said support and provided with an enlarged opening, a tool holder having a trunnion adjacent one end adapted to be received in said recess and provided with an enlargement adapted to seat in the enlarged opening whereby the holder is fulcrumed at one end in said support for pivotal movement, an arcuate slot formed in the opposite end of the holder and an adjustable set bolt passing through said slot and anchored in the support, said bolt being adapted to frictionally lock the holder upon the support to maintain the tool in cutting position except when the tool is subjected to excessive strain and at such time the holder pivots about its fulcrum to the extent of the slot and moves the tool out of the path of the stock being operated upon.

5. A tool holding device for mounting a cut-off tool on a lathe or the like, comprising a support having a shank adapted to be secured to the conventional tool post of the lathe, a tool holder fulcrumed at one end in said support for pivotal movement, and means associated with the other end of said holder for locking said holder against pivotal movement except when the tool is subjected to excessive strain when the holder pivots about its fulcrum to the extent of the slot and moves the tool out of the path of the stock being operated upon.

6. A tool holding device for mounting a cut-off tool in a machine such as a lathe, shaper or the like, comprising a support having a shank adapted to be secured to the conventional tool post of the machine, a tool holder fulcrumed at one end in said support for pivotal movement, an arcuate slot formed in the opposite end of the holder and an adjustable set bolt passing through said slot and anchored in the support, said bolt being adapted to frictionally lock the holder upon the support to maintain the tool in cutting position except when the tool is subjected to excessive strain and at such time the holder pivots about its fulcrum to the extent of the slot and moves the tool out of the path of the stock being operated upon.

7. A tool holding device for mounting a cut-off tool on a conventional carriage and tool post of a lathe, shaper or the like, comprising a member having a shank adapted to the rigidly secured to the tool post, a tool holder mounted upon said member and formed with a recessed face, a cut-off tool and support positioned in the recessed face of the tool holder, a clamping head on the tool holder adapted to retain the tool and its support in operative position, and a guide member for receiving the free end of the tool and tool support for guiding and maintaining the tool and its support against distortion to assure an accurate cut in the stock.

8. A cut-off tool assembly for a lathe or the like, comprising a supporting base provided with a shank adapted to be secured to the lathe for mounting the assembly thereon, a tool holder adjustably mounted on said base, a cut-off tool and tool support mounted in said holder, and a guide member adapted to receive the free end of the tool and tool support for directing and maintaining the tool aligned as it enters the stock and in its cutting operation, and supporting these members against bending or distortion.

9. A cut-off tool assembly for a lathe or the like, comprising a supporting base provided with a shank adapted to be secured to the lathe for mounting the assembly thereon, a tool holder adjustably mounted on said base, a cut-off tool and tool support mounted in said holder, an adjustable head adapted to clamp the tool and its support in operative position, a bracket detachably secured to the holder and head, and a combined support and guide for the tool and tool support, said guide being slotted to loosely receive the free end of the tool and tool support for directing the tool as it enters the stock and maintaining the tool and support aligned in cutting relation with the stock, and a rod secured at its forward end to the guide and having its rear end slidable in said bracket so that as the guide contacts the stock it is automatically retracted upon the tool and tool support.

DAVID S. ANTHONY.